United States Patent
Abulkhair

(10) Patent No.: US 11,247,177 B1
(45) Date of Patent: Feb. 15, 2022

(54) SWIRLING FLOW GENERATOR FOR MEMBRANE DISTILLATION

(71) Applicant: King Abdulaziz University, Jeddah (SA)

(72) Inventor: Hani Abdulelah Abulkhair, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/489,028

(22) Filed: Sep. 29, 2021

(51) Int. Cl.
*B01D 63/08* (2006.01)
*B01D 61/36* (2006.01)
(Continued)

(52) U.S. Cl.
CPC ......... *B01D 63/087* (2013.01); *B01D 61/364* (2013.01); *C02F 1/447* (2013.01); *B01D 2311/103* (2013.01); *B01D 2311/106* (2013.01); *B01D 2313/025* (2013.01); *B01D 2313/04* (2013.01); *B01D 2313/08* (2013.01); *B01D 2313/10* (2013.01); *B01D 2313/20* (2013.01); *C02F 2103/08* (2013.01); *C02F 2201/004* (2013.01); *C02F 2209/02* (2013.01)

(58) Field of Classification Search
CPC .............. B01D 63/087; B01D 61/364; B01D 2311/103; B01D 2311/106; B01D 2313/025; B01D 2313/04; B01D 2313/08; B01D 2313/10; B01D 2313/20; C02F 1/447; C02F 2103/08; C02F 2201/004; C02F 2209/02
See application file for complete search history.

(56) References Cited

U.S. PATENT DOCUMENTS 5,045,155 A * 9/1991 Ramsland .............. B01D 1/222
                                              202/174
5,500,134 A * 3/1996 Chahine ............... B01D 29/115
                                              210/787
(Continued)

FOREIGN PATENT DOCUMENTS

CN         106943877 B     5/2020

OTHER PUBLICATIONS

Liu et al, Journal of Membrane Science 499 (2016) 544-554. (Year: 2016).*

(Continued)

*Primary Examiner* — Pranav N Patel
(74) *Attorney, Agent, or Firm* — Oblon, McClelland, Maier & Neustadt, L.L.P.

(57) ABSTRACT

A fluid filter and method for filtering fluid feed using the fluid filter is described. The fluid filter comprises an upper disk plate having a first compartment spaced apart and placed parallel to a lower disk plate having a second compartment. The feed fluid enters the first compartment in a first vortex pattern in a first direction at a first temperature, and a permeate fluid enters the second compartment in a second vortex pattern in a second direction opposite the first direction at a second temperature, wherein the second temperature is lower than the first temperature. A hydrophobic, vapor permeable membrane positioned between the upper disk plate and the lower disk plate allows vapor to pass from the first compartment to the second compartment having the permeate fluid, thus filtering the feed fluid.

19 Claims, 8 Drawing Sheets

(51) Int. Cl.
*C02F 1/44* (2006.01)
*C02F 103/08* (2006.01)

(56) References Cited

U.S. PATENT DOCUMENTS

| | | | |
|---|---|---|---|
| 7,425,265 B2* | 9/2008 | Schoendorfer | B01D 29/117 |
| | | | 210/321.63 |
| 9,222,736 B2 | 12/2015 | Vatistas et al. | |
| 9,863,951 B2 | 1/2018 | Cho et al. | |
| 10,596,521 B2 | 3/2020 | Khalifa | |
| 2006/0138039 A1* | 6/2006 | Rudolf | B01D 25/24 |
| | | | 210/407 |
| 2013/0186824 A1 | 7/2013 | Harris et al. | |
| 2013/0228518 A1 | 9/2013 | Ito et al. | |

OTHER PUBLICATIONS

Shabnam Majidi Salehi et al, Journal of Membrane Science 504 (2016) 220-229. (Year: 2016).*
A. Saleh et al., Energy 36 (2011) 922-931. (Year: 2011).*
Francisco Sua'rez et al, Water Research 44 (2010) 4601-4615. (Year: 2010).*

* cited by examiner

SWIRLING FLOW GENERATOR FOR MEMBRANE DISTILLATION

BACKGROUND

Technical Field

The present disclosure is directed to a swirling flow generator for membrane distillation.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In a membrane distillation process, the potential difference in temperature is the driving force for mass transfer between two mediums, which are separated by a hydrophobic vapor permeable membrane. The temperature difference between the two mediums causes a vapor pressure difference resulting in evaporation of liquid molecules on the hot side to vapor, followed by diffusion of the vapor through pores of the hydrophobic vapor-permeable membrane to the cold side, where the vapor condenses to form a liquid having a temperature lower than boiling point of permeate. The hydrophobicity of the vapor permeable membrane acts as a barrier for the liquid thereby preventing its passage back through the membrane from the cold side to the hot side. The layers that are very close on either side of the membrane are called boundary layers. It is in this region where the potential difference in temperature is at its minimum value. An increase in the thickness of the boundary layer reduces the rate of evaporation and may consequently lower the exchange rate.

Some of the challenges in this process are temperature polarization, in which there is a decrease in the temperature gradient near the membrane edge, thereby lowering the potential of the fluid feed to move through the membrane, concentration polarization, where there is an accumulation of concentrated solutes near the edge of the membrane which causes either a decrease in driving force for separation or hinders water molecules from crossing the membrane in reverse osmosis applications, and fouling, which is continuous accumulation of solute modules near the membrane which may cause blocking of the membrane pores. One way to overcome the above problems is to manage the hydrodynamics of the fluid by reducing the effect of boundary layer.

Membranes are used in several different applications, such as desalination, water and chemical purification, by selectively separating certain chemicals/contaminants from the fluid feed. In the desalination process, the fluid feed (i.e., aqueous brine or the sea water) is passed onto the surface of a membrane, which selectively allows passage of water and retains salts on the fluid feed side. One of the main problems faced during desalination process is the polarization problem which is defined as either an accumulation of concentrated solution near the edge of the membrane (concentration gradient) or a decrease in the temperature gradient near the membrane edge, thereby lowering the potential of the fluid feed to pass through the membrane. When the fluid feed moves towards the solid surface (membrane), its velocity becomes almost zero (no slip condition) in these situations. Since fluids cannot move against the shear force caused by a high concentration gradient or a low temperature gradient, the fluid particles (solutes) which are not in direct contact with the solid surface gain momentum and move forward, but this movement is affected by the stagnant particles (shear effect). A velocity gradient profile is created from the plate surface (zero velocity) to maximum velocity of the stream of fluid feed. Particles near the membrane surface stay longer than mid-stream ones. The longer stasis time leads to a higher concentration of the fluid feed near membrane and hence lowers the transfer efficiency.

To overcome these drawbacks and improve the transfer efficiency of the membrane, certain conventional methods have suggested the use of self-heated membranes (See: A. Saleh et al., *Energy*, vol. 36, no. 2, pp. 922-931, February 2011; and F. Suarez et al., *Water Res.*, vol. 44, no. 15, pp. 4601-4615, August 2010, both incorporated herein by reference in their entirety). Additionally, membrane modification has been reported in literature to improve the membrane performance, and to enhance the mass transfer. (See: L. Liu et al., *J. Membr. Sci.*, vol. 499, pp. 544-554, February 2016; and S. Majidi Salehi et al.," *J. Membr. Sci.*, vol. 504, pp. 220-229, April 2016, both incorporated herein by reference in their entirety). However, the nature of flow of the fluid feed in each of the above references is in a straight line (optionally enhanced through use of spacers). As a result, the fluid loses its potential (temperature or concentration) while moving from inlet to outlet, its potential being high in the inlet, decreasing while moving through the membrane, and lowest at the outlet.

U.S. Pat. No. 9,222,736 describes a heat exchanger for transferring heat between the hot and cold streams by conduction. Although the introduction of fluid in a swirling manner was discussed in this patent, the apparatus is only suited for heat transfer, and not mass transfer.

U.S. Pat. No. 5,045,155 utilizes centrifugal force in water distillation. The apparatus as described in this patent comprises vertically stacked parallel disks which are rotated in a horizontal plane. The liquid to be distilled is introduced into the center of the disk stack and migrates by centrifugal force as a thin film across the top surface of each disk. During migration, the more volatile portion evaporates from the top surface and condenses on the bottom surface of a top, neighboring disk. The apparatus is multiple-effect in that the heat evolved from condensation is transferred through the thin, heat-conducting disks to provide the heat necessary for vaporization.

CN106943877B describes a vortex flow optimizing device having a shell, a hollow fiber membrane, a material liquid inlet, a liquid outlet, a penetrant side inlet, a penetrant side outlet, a liquid outlet valve, a bottom shell, a guide plate, a bracket, an exhaust valve, a liquid level viewing port. The device when applied to a membrane distillation system is capable of generating a vortex, to increase the film surface of disturbance in the film component, and also break the temperature boundary layer and the concentration boundary layer, to strengthen the heat transfer process in the film distilling process. Also, the swirling movement can take away particles of the membrane surface and the membrane module dead angle. The design of the device is based on hollow fiber membranes which is very different from the membrane used in the present disclosure.

U.S. Ser. No. 10/596,521B2 describes a water distilling device having a chamber for a feed stream, and a chamber for a coolant stream, the chambers separated by a hydrophobic membrane through which water vapor from the feed stream passes through the membrane to condense into a distilled water outlet path. A feed inlet connected to the feed zone, and a feed outlet connected to the distillate are placed in the same line, and they have the same angle. Further, a nozzle may introduce a swirling flow at the input path to create turbulence, and the circulation of the distilled water may form a laminar or a turbulent flow of the distilled water in the distillate zone to increase the contact area. The membrane distillation module of this invention is a traditional design having a circulating line and coolant stream to circulate a portion of distilled water which is formed and accumulated in a distillate zone. This is to enhance a permeate flux of water vapor through a hydrophobic membrane of the membrane distillation module. However, this apparatus does not create a vortex flow or have vanes to enhance the vortex flow. Also, the arrangement of feed inlet and distillate outlets is in the same line, which does not address the problem of the concentration gradient at the membrane surface.

Each of the aforementioned patent references suffers from one or more drawbacks hindering their adoption. Accordingly, it is one object of the present disclosure to provide a fluid filter for membrane distillation. The apparatus and methods of the present disclosure overcome the drawbacks of prior art such as polarization and fouling by directing the fluid feed flow in the fluid filter in a swirling manner, which enhances mixing and mitigates fouling at the boundary layer at a vapor permeable membrane.

SUMMARY

In an exemplary embodiment, a fluid filter for filtering a feed fluid is described. The fluid filter includes an upper disk plate including a first compartment and a lower disk plate, including a second compartment, spaced apart from and parallel to the upper disk plate. A hydrophobic, vapor permeable membrane is positioned between the upper disk plate and the lower disk plate. A first inlet is positioned on a first peripheral wall of the upper disk plate and is connected to a feed fluid having a first temperature. The first inlet is configured such that the feed fluid enters the first compartment at a first inlet angle with respect to the first peripheral wall and rotates in a first vortex pattern in a first direction. A second inlet is positioned on a second peripheral wall of the lower disk plate and is connected to a permeate fluid having a second temperature, the second temperature is lower than the first temperature. The second inlet is configured such that the permeate fluid enters the second compartment at a second inlet angle with respect to the second peripheral wall and rotates in a second vortex pattern in a second direction opposite the first direction. A first outlet is centrally positioned on an upper surface of the upper disk plate, that is configured to release the feed fluid from the first compartment. A second outlet is centrally positioned on a lower surface of the lower disk plate, that is configured to release the permeate fluid from the second compartment. A clamping device is configured to clamp the upper disk plate to the lower disk plate, such that the first compartment and the second compartment are separated by the hydrophobic, vapor permeable membrane. The hydrophobic, vapor permeable membrane is configured to filter the feed fluid by passing vapor from the first compartment to the second compartment, wherein the vapor dilute the permeate fluid in the second compartment.

In a second exemplary embodiment, a method of filtering a feed fluid is described, comprising: heating the feed fluid to a first temperature, the feed fluid having a first impurity concentration in a first range greater than or equal to 1 ppm and less than or equal to 200,000 ppm; cooling a permeate fluid to a second temperature lower than the first temperature, the permeate fluid having a second impurity concentration in a second range greater than or equal to 0 ppm and less than 100 ppm; receiving the feed fluid into a first compartment of an upper disk plate at a first inlet angle which generates a first vortex pattern of the feed fluid in a first direction; receiving the permeate fluid into a second compartment of a lower disk plate at a second inlet angle, equal and opposite to the first inlet angle, which generates a second vortex pattern of the permeate fluid in a second direction opposite the first direction; adjusting the first temperature of the feed fluid until a first portion of the feed fluid which contacts a first surface of a hydrophobic, vapor permeable membrane sandwiched between the first compartment and the second compartment forms a vapor; adjusting the second temperature of the permeate fluid such that the vapor crosses through the hydrophobic, vapor permeable membrane into the second compartment and condenses into the permeate fluid, thus lowering the second impurity concentration of the permeate fluid to a third impurity concentration; expelling a second portion of the feed fluid through a first port centrally located in the upper disk plate; and collecting the permeate fluid from a second port centrally located in the lower disk plate when the third impurity concentration of the permeate fluid is in a range of 0 ppm to less than 100 ppm.

In another exemplary embodiment, a method of assembling a fluid filter is described. The method includes inserting a first portion of an O-ring in a first annular groove located in a lower surface of an upper disk plate. A hydrophobic, vapor permeable membrane is positioned over a first compartment of the upper disk plate. Further, clamping a lower disk plate having a second annular groove and a second compartment to the upper disk plate such that a second portion of the O-ring is received in the second annular groove and the hydrophobic, vapor permeable membrane separates the first compartment and the second compartment. Further, a first inlet positioned on a first peripheral wall of the upper disk plate is connected to a feed fluid supply line; and a second inlet positioned on a second peripheral wall of the lower disk plate is connected to a permeate fluid supply line.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
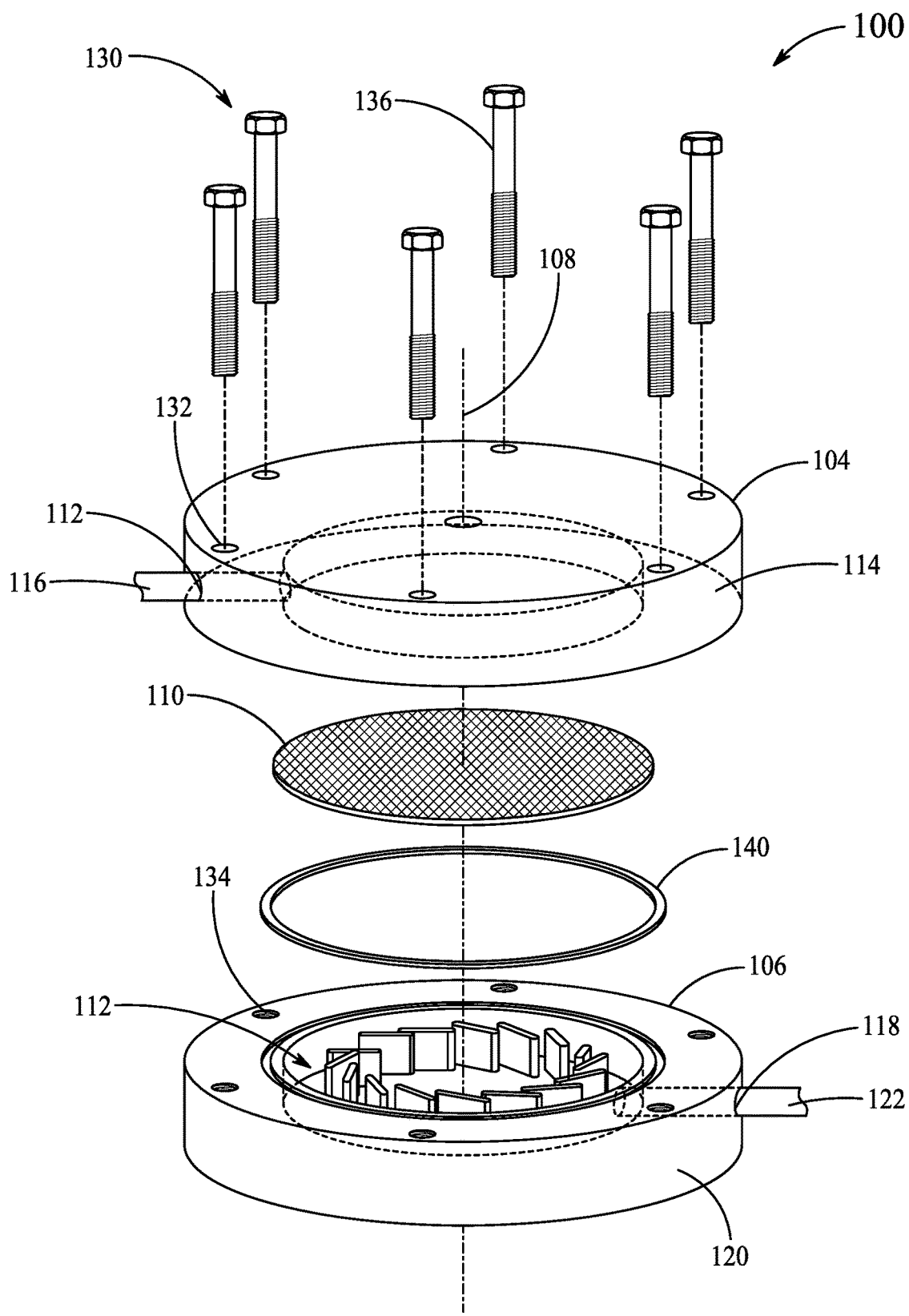
FIG. 1 is an exploded perspective view of a fluid filter having an upper disk plate, a lower disk plate, and a hydrophobic, vapor permeable membrane, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a fluid filter and using the fluid filter in filtering a fluid feed, using vapor permeable membrane technology. The fluid filter of the present disclosure allows for swirling movement of feed fluid and permeate fluid in opposite directions along a length thereof. Such a movement allows for better mixing thereby reducing the effect of gradient near the boundary layer of the membrane. Additionally, the fluid filter of the present disclosure prevents particles in the fluid feed from collecting on the membrane surface, thus consequently reduces the loss in transfer potential.

In membrane distillation, the process is performed under atmospheric pressure (almost zero). One of the main advantages of this process is that it does not require a high pressure or even a small amount of pressure. However, there should be a difference in temperature between the feed and permeate streams. This difference on temperature causes a difference in vapor pressure. Vapor pressure relates to the tendency of water to become vapor. As temperature increases, this tendency for the water to become vapor increases. Therefore, water can become vapor without needing to reach the boiling point. This is similar to evaporation of water from a wet surface over time, or the evaporation of sea water without reaching the boiling point. In membrane distillation, the difference in temperature between the feed and permeate causes water to evaporate from the hot side and condense in the cold side. The membrane that separates the feed and permeate should allow vapor to pass through and should not allow water to pass. Thus, it should be hydrophobic.

In the fluid filter of the present disclosure, there should be a difference in temperature between the feed and permeate of not less than 5 degrees Celsius. For the feed side, the temperature range is between 40 degrees Celsius and 90 degrees Celsius and in the permeate it is between 5 degrees Celsius and 40 degrees Celsius. As the temperature difference between the feed and permeate increases, the evaporation from the feed side to the permeate side increases.

In FIG. 1, an exploded perspective view of a fluid filter 100 is described. The fluid filter 100 of the present disclosure finds application in desalination (removal of salt from water), chemical treatment, and wastewater treatment processes for filtering feed fluid. In an example, the fluid feed may include one or more of seawater, brackish water, gray water, industrial effluent, oil fill recovery water, and water for chemical treatment.

In a non-limiting example, the fluid filter 100 of the present disclosure may be used to separate at least a portion of water from a feed fluid of aqueous brine to provide clean water as a diluted permeate fluid (herein referred to as the distillate). Salinity concentration of the aqueous brine may be in a range of 1-10%, while that of the distillate may be in a range of 0-0.001%. The salinity concentration of the feed fluid may be in the range of 5,000 ppm to 200,000 ppm when sea water or brine is used as the feed fluid. The impurity concentration of the permeate fluid may be in the range 1 ppm to 100 ppm. The impurity concentration of the distillate may be 0 ppm to less than 100 ppm.

The fluid filter 100 includes an upper disk plate 104 and a lower disk plate 106 that are spaced apart and are placed parallel to each other. The upper disk plate 104 and the lower disk plate 106 are generally cylindrical and have an axis of symmetry 108. Particularly, the upper disk plate 104 is defined as a hollow cylindrical body configured to receive a feed fluid therein, and the lower disk plate 106 is defined as a hollow cylindrical body configured to receive a permeate fluid therein. A hydrophobic, vapor permeable membrane 110 is positioned between the upper disk plate 104 and the lower disk plate 106. The hydrophobic, vapor permeable membrane 110 is alternatively referred to as the membrane 110 or a sieve or a porous device.

The fluid filter 100 further includes a first inlet 112 positioned on a first peripheral wall 114 of the upper disk plate 104 and fluidly connected to a feed fluid supply line 116. A second inlet 118 is positioned on a second peripheral wall 120 of the lower disk plate 106 and connected to a permeate fluid supply line 122.

The upper disk plate 104 and the lower disk plate 106 are generally cylindrical, co-axial, and are held together with a clamping device 130. Extending through the upper disk plate 104 are a first set of screw holes 132 and, in a similar manner, a second set of threaded screw holes 134 extends through the lower disk plate 106. The clamping device 130 further includes a plurality of threaded screws 136. Each of the second set of threaded screw holes 134 is configured to hold a corresponding threaded screw 136 which extends through a corresponding screw hole 132 from the first set of screw holes 132 in the upper disk plate 104. The fluid filter 100 further includes an O-ring 140 placed between the upper disk plate 104 and the lower disk plate 106. The O-ring 140 may act as a sealant between the upper disk plate 104 and the lower disk plate 106 when the clamping device 130 is closed.

Figure 2A:
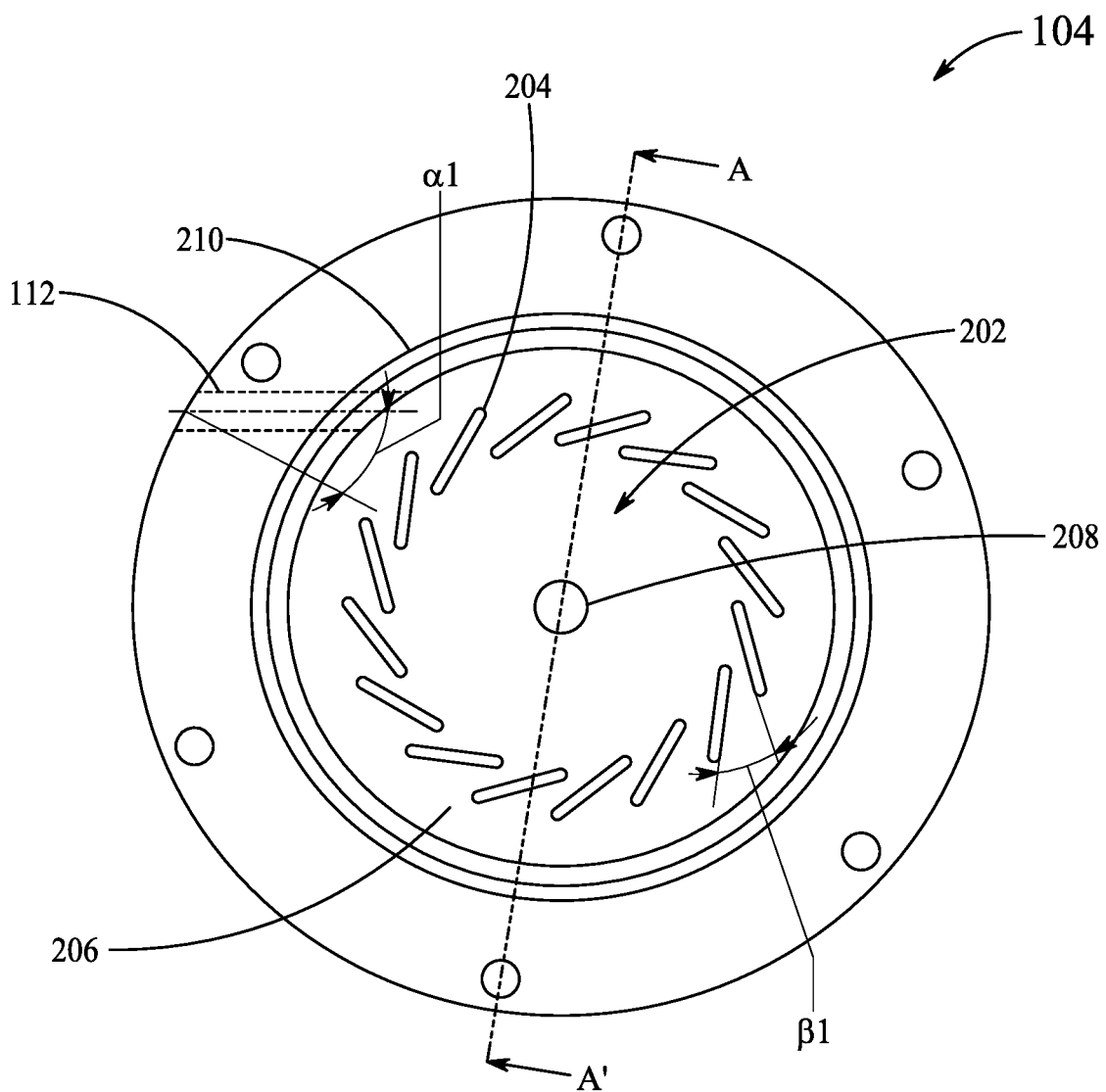
FIG. 2A is a plan view of the upper disk plate of the fluid filter depicting a first set of guide vanes, according to certain embodiments.

Referring to FIG. 2A, a plan view of the upper disk plate 104 is described. Referring to FIG. 1 and FIG. 2A, the upper disk plate 104 includes a first compartment 202 configured to receive the feed fluid therein. On the first peripheral wall 114 of the upper disk plate 104 is the first inlet 112 configured to direct the flow of the feed fluid having a first temperature from the feed fluid supply line 116 to the first compartment 202. The first inlet 112 is positioned at a first inlet angle 'α1' with respect to the first peripheral wall 114 of the upper disk plate 104, where the first inlet angle 'α1' aids in generating a first vortex pattern of the feed fluid in a first direction in the first compartment 202. The first inlet angle 'α1' is determined to induce the first vortex pattern of the feed fluid in first direction in the first compartment 202. The first inlet angle 'α1' is an angle defined between a longitudinal axis of the first inlet 112 and a radial line connecting an opening of the first inlet 112 defined in the first peripheral wall 114 and a center defined by circular shape of the upper disk plate 104. In an aspect, the first inlet 112 is positioned in the upper disk plate 104 at the first inlet angle 'α1' in a range of 25 degrees to 30 degrees with respect to the first peripheral wall 114 of the upper disk plate 104. The first inlet angle 'α1' is defined between 25 degrees to 30 degrees to aid in generating the first vortex pattern of the feed fluid along an interior wall of the first compartment 202, parallel to the membrane 110, in the first direction. The first compartment 202 is constructed from one of polyvinylidene fluoride (PVDF), polypropylene (PP) and polytetrafluoroethylene (PTFE).

The upper disk plate 104 further includes the first set of guide vanes 204 arranged annularly on an upper surface 206 within the first compartment 202. The first set of guide vanes 204 are configured to increase a first rotational speed of the feed fluid. The first set of guide vanes 204 are placed in a circular path where each vane from the first set of guide vanes 204 is spaced apart from an adjacent vane at a first vane angle 'β1'. In one example, the first set of guide vanes 204 can be made integral with the upper disk plate 104 and positioned in a clockwise or counterclockwise rotational orientation to facilitate circular or counter-rotating swirl respectively. In another example, the first set of guide vanes 204 can be adjustably disposed within the first compartment 202 of the upper disk plate 104. As can be observed from the FIG. 2A, the first set of guide vanes 204 are positioned at the first vane angle 'β1' with respect to the upper surface 206 of the upper disk plate 104, such that the first vane angle 'β1' is in a range of 15 degrees to 45 degrees. The first vane angle 'β1' is further defined as an angle between a plane of each of the two adjacent vanes. When so angled, the first set of guide vanes 204 has an effectively increased surface area allowing for greater contact of the feed fluid with the first set of guide vanes 204. During operation, the first vane angle 'β1' of the first set of guide vanes 204 results in agitation of the feed fluid flowing through the first peripheral wall 114 of the first compartment 202. As a result, the solids or solutes are kept in suspension, therefore there is less accumulation or clogging near the membrane 110, which prevents fouling. Also, the agitated mixing ensures that the concentration polarization is reduced along the first compartment 110. In a non-limiting example, the first set of guide vanes 204 may be made of materials such as stainless steel, carbon steel, plastic or the like, depending on the type of feed fluid that is to flow through the fluid filter 100.

Figure 5:
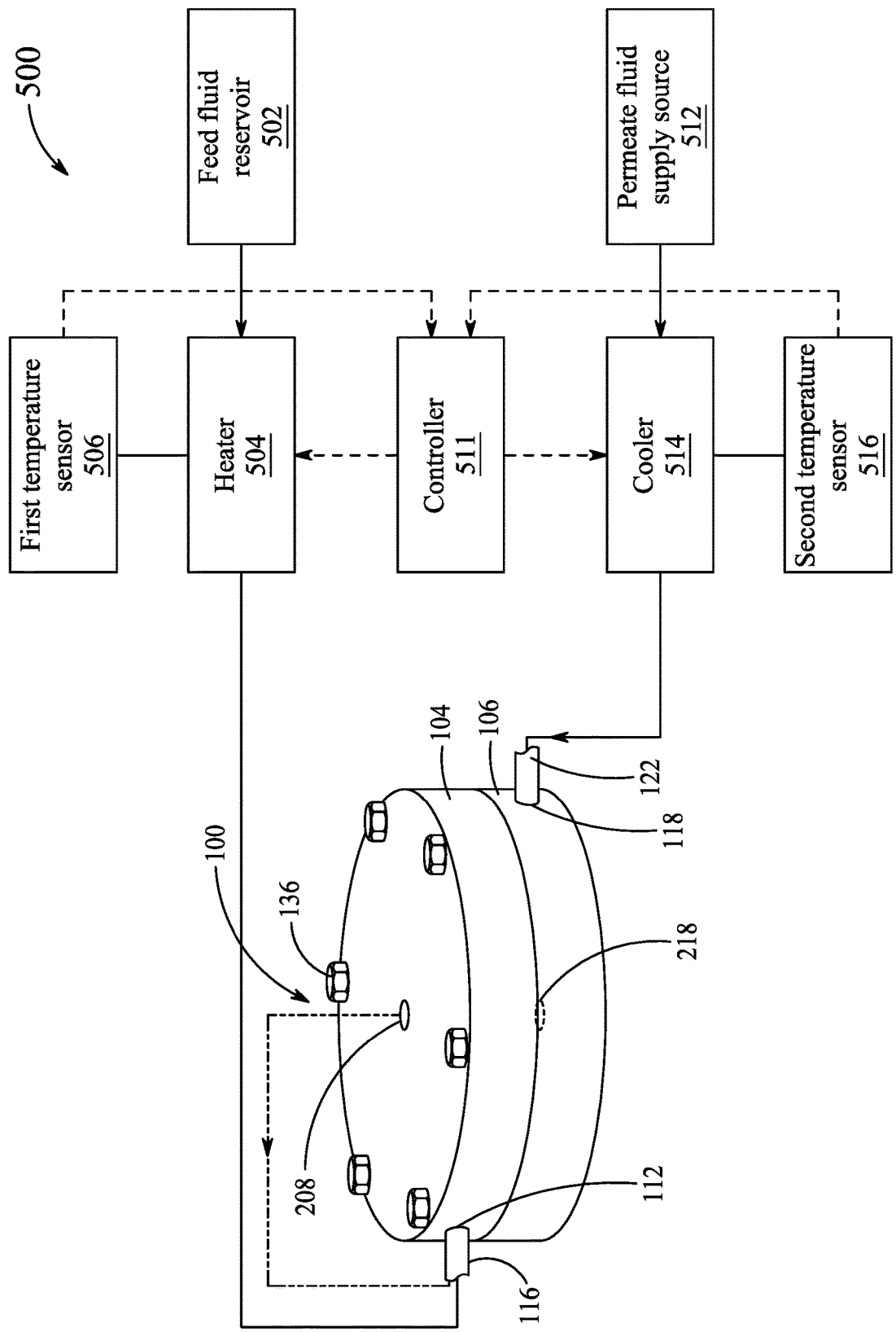
FIG. 5 is an exemplary schematic diagram depicting a control system in association with a flow of feed fluid and permeate fluid in the fluid filter, according to certain embodiments.

The upper disk plate 104 further includes a first outlet 208 centrally positioned on an upper surface of the upper disk plate 104. The first outlet 208 allows the release of the feed fluid from the first compartment 202 for discharge. In an example, the feed fluid that exits the first outlet 208 has a high concentration of impurities. Alternatively, the feed fluid that exits the first outlet 208 can re-enter the first inlet 112 for re-filtration as shown in FIG. 5.

The upper disk plate 104 further includes a first annular groove 210 located in a lower surface of the upper disk plate 104 which is radially located between the first set of screw holes 132 and the first compartment 202. The first annular groove 210 receives the O-ring 140.

Figure 2B:
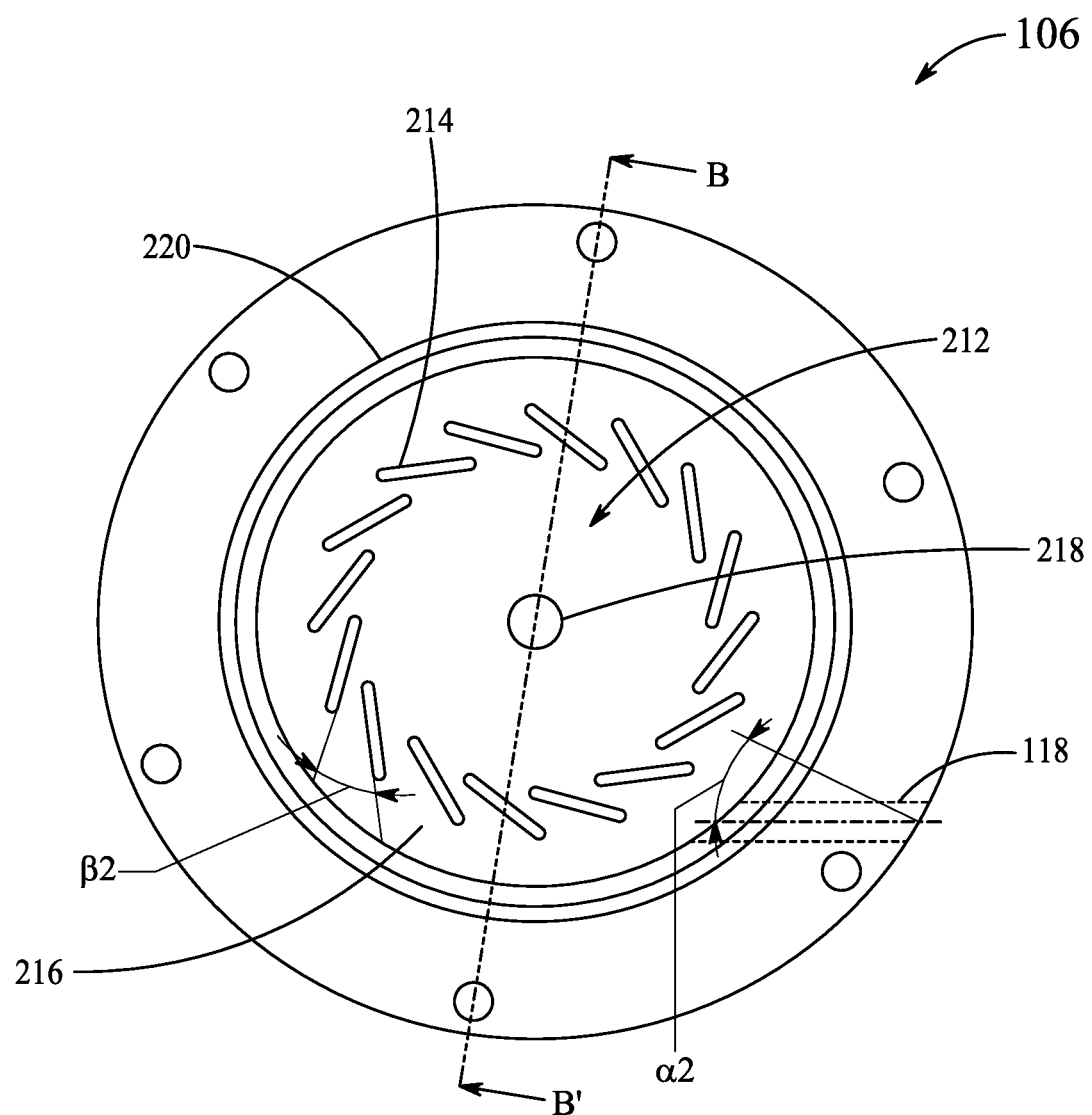
FIG. 2B is a plan view of the lower disk plate of the fluid filter depicting a second set of guide vanes, according to certain embodiments.

Referring to FIG. 2B, a plan view of the lower disk plate 106 is described. The lower disk plate 106 has substantially the same configuration as the upper disk plate 104. Referring to FIG. 1 and FIG. 2B, the lower disk plate 106 includes a second compartment 212 configured to receive the permeate fluid therein. On the second peripheral wall 120 of the lower disk plate 106 is the second inlet 118 configured to direct the permeate fluid from the permeate fluid supply line 122 to the second compartment 212. Further, the second inlet 118 is configured to direct the flow of the permeate fluid having a second temperature from the permeate fluid supply line 122 to the second compartment 212. The second inlet 118 is positioned at a second inlet angle 'α2' with respect to the second peripheral wall 120 of the lower disk plate 106, where the second inlet angle 'α2' aids in generating a second vortex pattern of the permeate fluid in a second direction in the second compartment 212. The second inlet angle 'α2' is determined to induce the second vortex pattern of the permeate fluid in second direction in the second compartment 212. The second inlet angle 'α2' is an angle defined between a longitudinal axis of the second inlet 118 and a radial line connecting an opening of the second inlet 118 defined in the second peripheral wall 120 and a center defined by circular shape of the lower disk plate 106. In an aspect, the second inlet 118 is positioned in the lower disk plate 106 at a second inlet angle 'α2' in a range of minus 25 degrees to 30 degrees with respect to the second peripheral wall 120 of the lower disk plate 106. The permeate fluid enters the second compartment 212 at the second inlet angle 'α2' and rotates in the second vortex pattern in the second direction that is equal in speed but opposite the first direction of the feed fluid. In other words, the permeate fluid swirls along the second peripheral wall 120 of the second compartment 212 in a circular manner, parallel to the membrane 110, in a direction counterclockwise to the flow of the feed fluid in the first compartment 202 during the filtration process. The second inlet angle 'α2' is defined between minus 25 degrees to 30 degrees to aide in generating the second vortex pattern of the permeate fluid along the second peripheral wall 120 of the second compartment 212, parallel to the membrane 110, in the second direction, with circular behavior in a counterclockwise direction. In one example, the rotational speed of the feed fluid and the permeate fluid may be the same. In another example, the rotational speed of the feed fluid and the permeate fluid may be different. In a non-limiting example, the second compartment 212 may be constructed from one of polyvinylidene fluoride (PVDF), polypropylene (PP) and polytetrafluoroethylene (PTFE).

The lower disk plate 106 further includes a second set of guide vanes 214 connected to a lower surface 216 of the second compartment 212. The second set of guide vanes 214 are arranged annularly within the second compartment 212 and is configured to increase a second rotational speed of the permeate fluid in the second vortex pattern at a center of the second compartment 212. The second set of guide vanes 214 are spaced apart from and adjacent to one another and form a circular path between two adjacent vanes. The second set of guide vanes 214 are placed in the circular path where each vane from the second set of guide vanes 214 is spaced apart from an adjacent vane at a second vane angle 'β2'. In one example, the second set of guide vanes 214 can be made integral with the lower disk plate 106 and positioned in a clockwise or counterclockwise rotational orientation to facilitate counter-rotating swirl. In another example, the second set of guide vanes 214 can be adjustably disposed within the second compartment 212 of the lower disk plate 106.

As can be observed in FIG. 2B, the second set of guide vanes 214 are positioned at the second vane angle 'β2' with respect to the lower surface 216 of the second compartment 212, such that the second vane angle 'β2' is in a range of minus 15 degrees to 45 degrees. When so angled, the second set of guide vanes 214 effectively increase the surface area of the guide vanes allowing for greater contact of the permeate fluid with the second set of guide vanes 214. During operation, the second vane angle 'β2' of the second set of guide vanes 214 agitates the permeate fluid flowing through the second peripheral wall 120 of the second compartment 212, which keeps the solids or solutes in suspension, as a result of which there is less accumulation or clogging near the membrane 110, thereby preventing fouling, which is a common drawback of conventional fluid filters.

The lower disk plate 106 further includes a second outlet 218 that is centrally positioned on the lower surface of the lower disk plate 106. The diluted permeate fluid that is obtained after the filtration process can exit the second compartment 212 through the second outlet 218. The lower disk plate 106 further includes a second annular groove 220 located in an upper surface of the lower disk plate 106 and is radially located between the second set of threaded screw holes 134 and the second compartment 212. The second annular groove 220 is coaxially located to align with the first annular groove 210. The first annular groove 210 and the second annular groove 220 help to position the O-ring 140 therein to block fluid flow or prevent any leakage between the first compartment 202 and the second compartment 212 when the clamping device 130 is closed.

Referring to FIG. 1 through 2B, during the filtration process, the membrane 110 which is sandwiched between the first compartment 202 and the second compartment 212, comes in contact with the feed fluid and the permeate fluid. The feed fluid flows within the first compartment 202 as a hot stream, where the first temperature of the fluid feed is in a range of 40-90 degrees Celsius, while the permeate fluid flows within the second compartment 212 as a cold stream having the second temperature in a range of 5 degrees Celsius to 40 degrees Celsius. The difference between the first temperature and the second temperature across either side of the membrane 110 and the high pressure of the injected feed fluid at the first inlet 112 causes a vapor pressure difference sufficient to evaporate the feed fluid, even before reaching its boiling point. The vapors from the feed fluid in the first compartment 202 pass through the membrane 110 and enter the second compartment 212 where the vapors condense to dilute the permeate fluid, leaving behind a residual concentrated fluid feed in the first compartment 202. The hydrophobic nature of the membrane 110 prevents the passage of the feed fluid from the first compartment 202 to the second compartment 212 through the membrane 110, while the vapor permeable property of the membrane allows for passage of the vapor from the first compartment 202 to the second compartment 212. The operation of the fluid filter 100 may achieve an impurity concentration in the distillate (diluted permeate feed) 138 in a range of 0% to 0.001%, or less than 100 ppm.

Figure 3A:
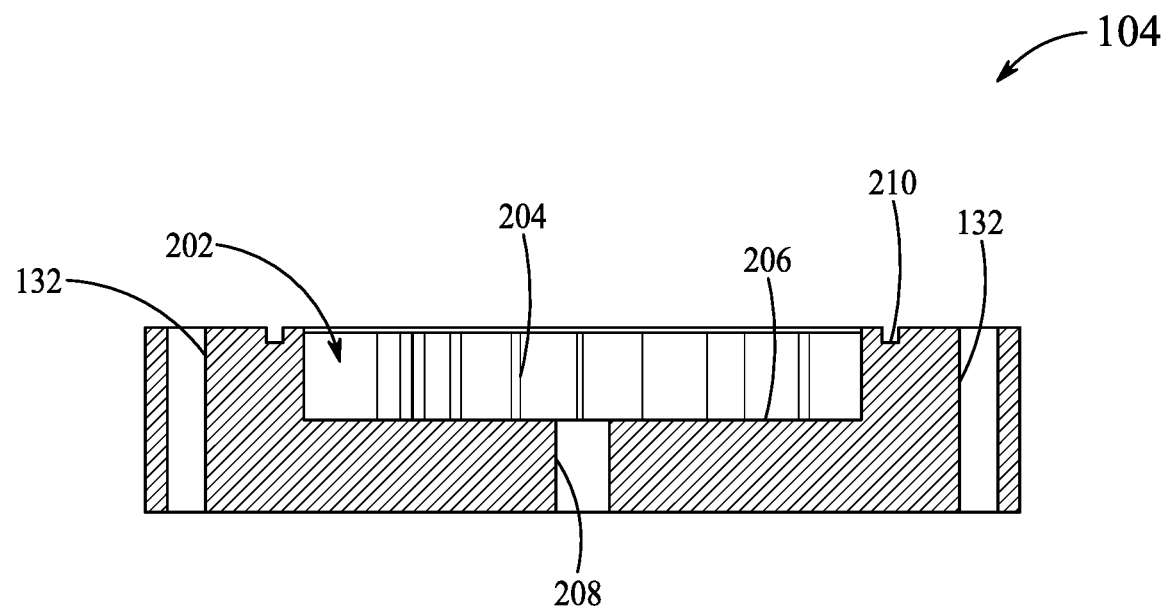
FIG. 3A is a cross-sectional view taken along line A-A' of the upper disk plate of FIG. 2A, according to certain embodiments.

Referring to FIG. 3A, a cross-sectional view taken along line A-A' of the upper disk plate 104 of FIG. 2A is illustrated. Referring to FIG. 2A and FIG. 3A, the upper disk plate 104 includes the first compartment 202, the first set of guide vanes 214, the first set of screw holes 132, the first outlet 208, the first annular groove 210. The first compartment 202 is coaxially defined in the upper disk plate 104 and is a hollow interior space which receives the feed fluid therein. The first set of guide vanes 204 are arranged annularly within the first compartment 202 and serve to increase the first rotational speed of the feed fluid at the center of the first compartment 202. The first outlet 208 is centrally positioned on the upper surface of the upper disk plate 104 to discharge the concentrated feed fluid during the filtration process. The first outlet 208 may be fluidly connected to later stage filtration devices to remove solid particles. The first set of screw holes 132 is configured to slidably receive the threaded screws 136 there through. Particularly, a non-threaded portion of a shank of the threaded screw 136 is received in the screw hole 132 of the upper disk plate 104. The first annular groove 210 allows positioning of the O-ring 140 therein. In an example, a cross-section of the first annular groove 210 may be square, rectangular, oval, circular, or any other shape known in the art. The first annular groove 210 is configured to receive a first half portion of the O-ring 140, and a first half of cross-sectional area defined by the O-ring 140 may be greater than a cross-sectional area of the first annular groove 210.

Figure 3B:
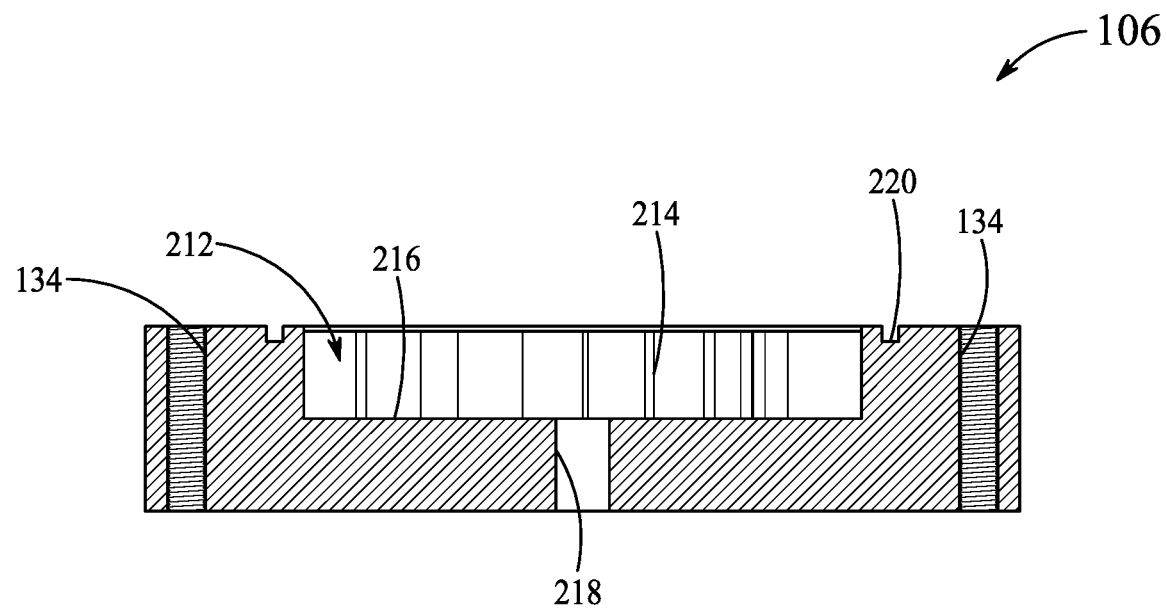
FIG. 3B is a cross-sectional view taken along line B-B' of the lower disk plate of FIG. 2B, according to certain embodiments.

Referring to FIG. 3B, a cross-sectional view taken along line B-B' of the lower disk plate 106 of FIG. 2B is illustrated. Referring to FIG. 2B and FIG. 3B, the lower disk plate 106 includes the second compartment 212, the second set of guide vanes 214, the second set of threaded screw holes 134, the second outlet 218, and the second annular groove 220. The second compartment 212 is coaxially defined in the lower disk plate 106 and is designed as an engraved hollow space to receive the permeate fluid therein. The second set of guide vanes 214 are arranged annularly within the second compartment 212 to increase the second rotational speed of the permeate fluid at the center of the second compartment 212. The second outlet 218 is centrally positioned on the lower surface of the lower disk plate 106 to allow the diluted permeate fluid or the distillate to exit the second compartment 212 through the second outlet 218 during the filtration process. The second outlet 218 may be fluidly connected to a clean water reservoir. The second set of threaded screw holes 134 is configured to threadably engage with the threaded screws 136. The second annular groove 220 allows positioning of the O-ring 140 therein. In an example, a cross-section of the second annular groove 220 may be square, rectangular, oval, circular, or any other shape known in the art. The second annular groove 220 is configured to receive a second half portion of the O-ring 140, and a second half of cross-sectional area defined by the O-ring 140 may be greater than a cross-sectional area of the second annular groove 210. In an example, the O-ring 140 may have a cross-sectional shape in conformance with a cross-sectional shape of the first and second annular grooves 210, 220.

Figure 4A:
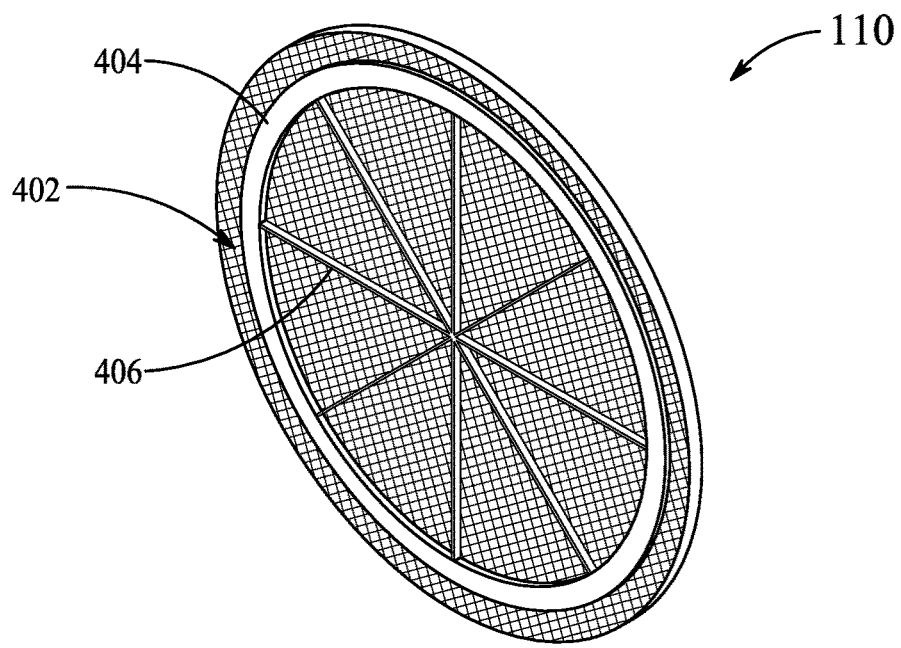
FIG. 4A is a top perspective view of the hydrophobic, vapor permeable membrane, according to certain embodiments.
Figure 4B:
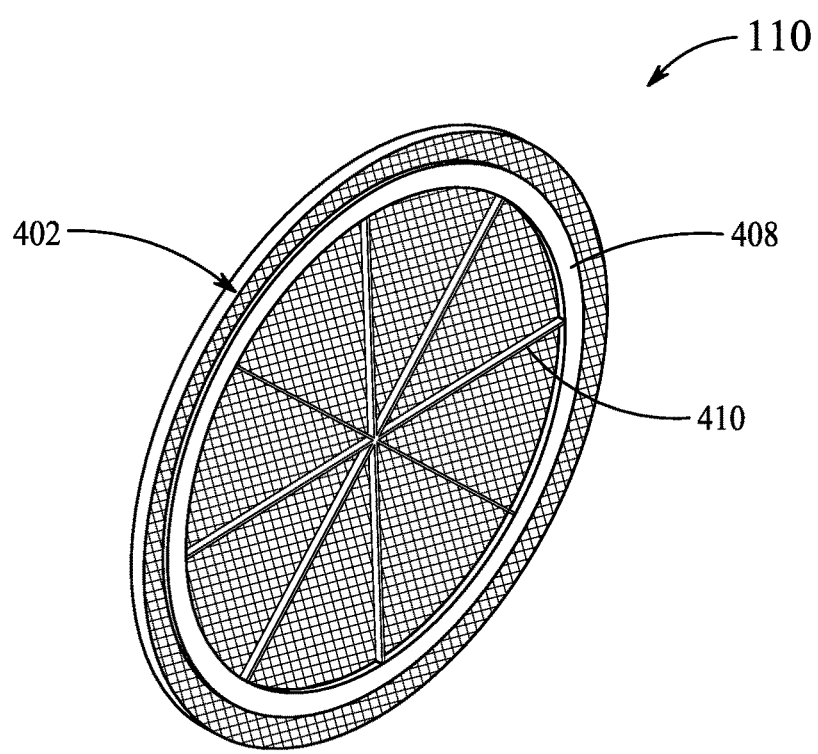
FIG. 4B is a bottom perspective view of the hydrophobic, vapor permeable membrane, according to certain embodiments.

Referring to FIG. 4A and FIG. 4B, a top and bottom perspective view of the hydrophobic, vapor permeable membrane 110, respectively, is illustrated. The membrane 110 is configured to be positioned between the first compartment 202 and the second compartment 212 (as shown in the FIG. 1) when the fluid filter 100 is assembled using the clamping device 130. The hydrophobic nature of the membrane 110 prevents the passage of fluids from the first compartment 202 to the second compartment 212 through the membrane 110, while the vapor permeable property allows for passage of vapor across the first compartment 202 and the second compartment 212. The membrane 110 is made up of polymers materials selected from the group of polyvinylidene fluoride (PVDF), polypropylene (PP) and polytetrafluoroethylene (PTFE) to impart hydrophobicity. In an aspect, the fluid filter 100 may use multiple membranes 110 for filtering the feed fluid which may be arranged in a serial configuration, and each of which may be same or different in pore size. In an aspect, the membrane 110 may be made of material that can withstand the temperature gradient present on either side of the membrane 110. The fluid filter 100 further includes a support structure 402 around the hydrophobic, vapor permeable membrane 110. The support structure 402 includes a first annular ring 404 having a first plurality of spokes 406 and a second annular ring 408 having a second plurality of spokes 410. The first annular ring 404 and the second annular ring 408 are configured to sandwich the hydrophobic, vapor permeable membrane 110 to strengthen the membrane 110 when assembled and clamping device 130 is closed.

Referring to FIG. 5, an exemplary block diagram of a control system 500 is illustrated in association with a flow of the feed fluid and the permeate fluid through various elements in the feed fluid supply line 116 and the permeate fluid supply line 122, respectively. The various elements in the feed fluid supply line 116 include, but are not limited to, a feed fluid reservoir 502, a heater 504, and a first temperature sensor 606. In a non-limiting example, the heater may include a hot bath heated by coils. The feed fluid reservoir 502 is connected to the first inlet 112 by the feed fluid supply line 116 and is configured to store the feed fluid. In an aspect, the feed fluid has an impurity concentration in a range of 1 ppm to 200,000 ppm. In a non-limiting example, impurities may be one or more of monovalent salts, divalent and multivalent salts, and organic species. When the fluid filter 100 is used for desalination, the feed fluid may have a salinity concentration in a range of 5,000 ppm to 200,000 ppm. A heater 504 is connected to the feed fluid supply line 116 and located between the feed fluid reservoir 502 and the first inlet 112. The heater 504 is configured to heat the fluid feed that is flowing through the feed fluid supply line 116 to the first temperature. In an aspect, the first temperature is pre-determined and is in a range of 40 degrees Celsius to 90 degrees Celsius. The heater 504 is further connected to or embedded with the first temperature sensor 506. The first temperature sensor 506 is configured to measure the first temperature and generate a first temperature signal. The control system 500 of the fluid filter 100 includes a controller 511 having circuitry that is in communication with the first temperature sensor 506 to receive the first temperature signal. The controller 511 is also in communication with the heater 504. The controller 502 is configured to adjust the first temperature to a temperature in the range of 40 degrees Celsius to 90 degrees Celsius based on the first temperature signal.

The various elements connected to the permeate fluid supply line 122 include, but are not limited to: a permeate fluid supply source 512, a cooler 514, and a second temperature sensor 516. The cooler 514 may be a fan or refrigeration unit which keeps the permeate fluid at a desired temperature range of 5 degrees Celsius to 40 degrees Celsius. Alternatively, the cooler 514 may be a cold bath. The permeate fluid supply source 512 is connected to the second inlet 118 by the permeate fluid supply line 122 and is configured to store the permeate fluid. In an aspect, the permeate fluid has an initial impurity concentration of 0 ppm to 100 ppm, for example, tap water. The impurities may be monovalent salts, divalent and multivalent salts, and/or organic species. When the fluid filter 100 is used for desalination purposes, the permeate fluid has an initial salinity concentration of 0% to less than 1%. The cooler 514 is connected to the permeate fluid supply line 122 and located between the permeate fluid supply source 512 and the second inlet 118. The cooler 514 is configured to cool the permeate fluid that is flowing through the permeate fluid supply line 122 to the second temperature. In an aspect, the second temperature is pre-determined and is in a range of 5 degrees Celsius to 40 degrees Celsius. The second temperature of the permeate fluid is determined to be less than the first temperature of the feed fluid by at least 5 degrees, which aids in condensing the vapor. The cooler 514 is further connected to or embedded within the second temperature sensor 516. The second temperature sensor 516 is configured to measure the second temperature and generate a second temperature signal. The controller 511 is in communication with the second temperature sensor 516 to receive the second temperature signal. The controller 511 is also in communication with the cooler 514. The controller 511 is configured to adjust the second temperature to a temperature in the range of 5 degrees Celsius to 40 degrees Celsius based on the second temperature signal.

In an alternative, the temperature of the feed fluid and the permeate fluid may be manually adjusted by an operator. The operator may view the temperature of the feed fluid and the permeate fluid on a thermometer or a temperature sensor having probes and a display which shows the temperature. The operator may then adjust the temperature of the heater or the cooler as needed to keep the temperature difference between the feed fluid and the permeate fluid to at least 5 degrees Celsius.

Figure 6:
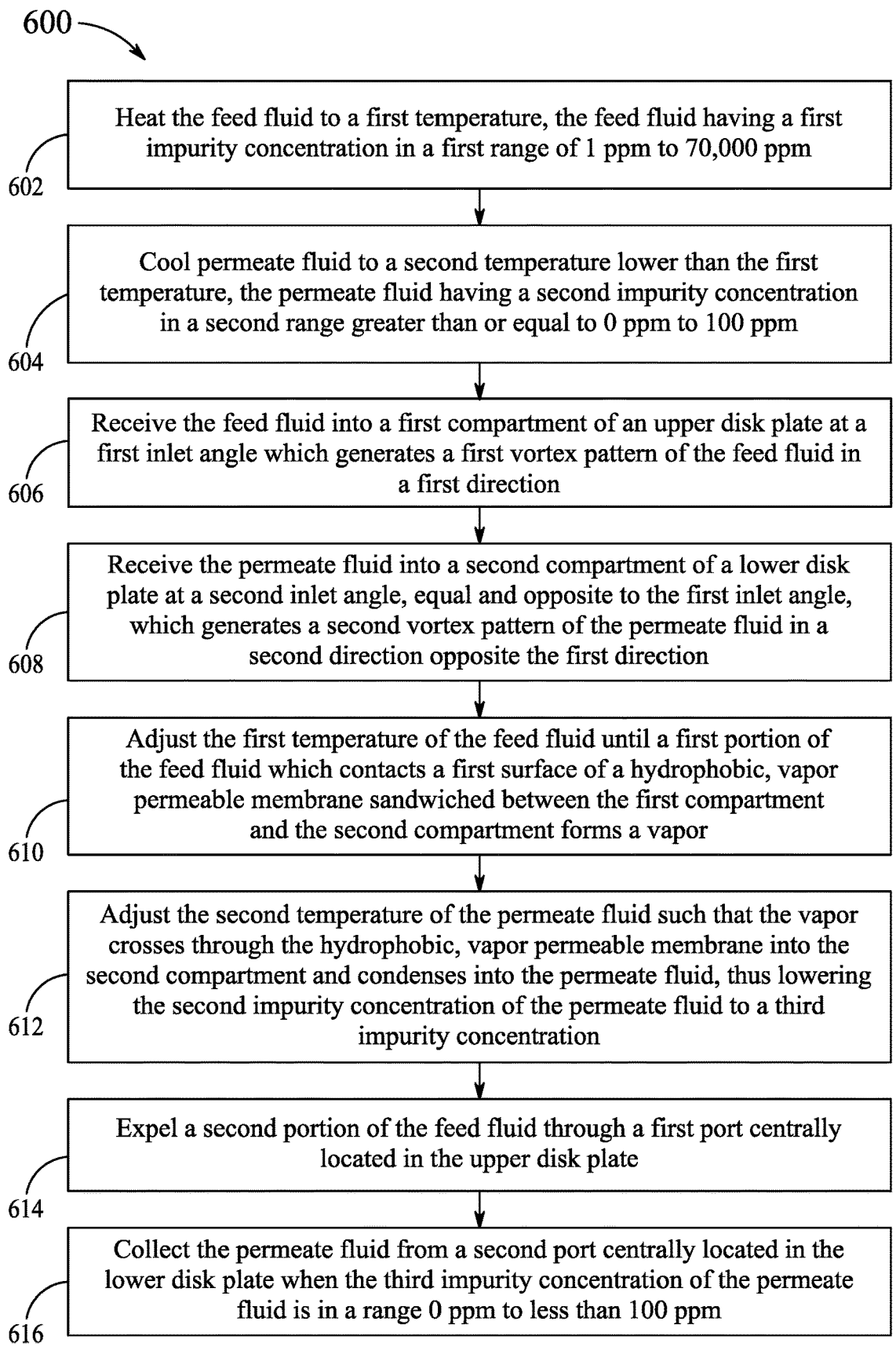
FIG. 6 is an exemplary flowchart illustrating a method of filtering a feed fluid using the fluid filter, according to certain embodiments.

Referring to FIG. 6, an exemplary flowchart of a method 600 for filtering fluid feed with the fluid filter 100 is illustrated. The method 600 is described with reference to the fluid filter 100 as illustrated in FIG. 1 through FIG. 5.

At step 602, the method 600 includes heating the feed fluid to the first temperature. The first temperature of the feed fluid is in the range of 40 degrees Celsius to 90 degrees Celsius. The feed fluid may be brine water, grey water or any other water having the first impurity concentration in a first range of 1 ppm to 200,000 ppm. The impurities may be monovalent salts, divalent and multivalent salts, and/or organic species.

At step 604, the method 600 includes cooling the permeate fluid to the second temperature that is lower than the first temperature. The second temperature is in the range of 5 degrees Celsius to less than 40 degrees Celsius. The permeate fluid has a second impurity concentration lower than the first impurity concentration, where the second impurity concentration is in a second range greater than or equal to 1 ppm and less than 100 ppm. It is to be understood that the second temperature and the second impurity concentration of the permeate fluid are lower than the first temperature and the first impurity concentration of the feed fluid. At step 606, the method 600 includes receiving the feed fluid into the first compartment 202 of the upper disk plate 104, through the first inlet 112, at the first inlet angle 'α1' which induces the first vortex pattern in the first direction. The first inlet angle 'α1' is so determined such that the flow of the feed fluid through the first inlet 112 automatically generates the first vortex pattern along the first peripheral wall 114 parallel to the membrane 110, but in a circular manner, i.e., in the clockwise direction.

At step 608, the method 600 includes receiving the permeate fluid into the second compartment 212 of the lower disk plate 106, through the second inlet 118, at the second inlet angle 'α2'. The second inlet angle 'α2' is so determined such that the flow of the permeate fluid through the second inlet 118 automatically induces the second vortex pattern along the second peripheral wall 120 parallel to the membrane 110, with a circular behavior, in the counterclockwise direction. In an aspect, the second inlet angle 'α2' is equal and opposite to the first inlet angle 'α1'.

The method 600 further includes increasing the first rotational speed of the first vortex pattern in the feed fluid in the first direction by passing the feed fluid through the first set of guide vanes 204 connected to the upper surface 206 of the first compartment 202 and arranged annularly within the first compartment 202, while the second rotational speed of the second vortex pattern in the permeate fluid in the second direction can be increased by passing the permeate fluid through the second set of guide vanes 214 connected to the lower surface 216 of the second compartment 212 and arranged annularly within the second compartment 212. The first rotational speed of the feed fluid and the second rotational speed of the permeate fluid increase the turbulence within the first compartment 202 and the second compartment 212 of the fluid filter 100, respectively. The increased turbulence leads to better mixing, thereby overcoming the challenges associated with concentration polarization. Also, the increased turbulence leads to breaking the boundary layer, thereby preventing the accumulation of solutes near the membrane, and consequently overcomes the drawbacks associated with fouling.

At step 610, the method 600 includes adjusting the first temperature of the feed fluid until the first portion of the feed fluid 102 which contacts a first surface of the hydrophobic, vapor permeable membrane 110, sandwiched between the first compartment 202 and the second compartment 212, forms the vapor. This is achieved by heating the feed fluid to the first temperature that is in the range of 40 degrees Celsius to 90 degrees Celsius.

At step 612, the method 600 includes adjusting the second temperature such that the vapor crosses through the hydrophobic, vapor permeable membrane 110 into the second compartment 212 and condenses into the permeate fluid, thus lowering the second impurity concentration of the permeate fluid to the third impurity concentration. This is achieved by cooling the permeate fluid to the second temperature that is in the range of 5 degrees Celsius to 40 degrees Celsius.

The temperature difference is created on either side of the hydrophobic, vapor permeable membrane 110 by adjusting the second temperature and the second pressure of the permeate fluid. The temperature difference on either side of the membrane 110 causes evaporation of molecules from the feed fluid forming vapor. The vapor crosses through the hydrophobic, vapor permeable membrane 110 into the second compartment 212 and condenses into the permeate fluid, thus lowering the second impurity concentration of the permeate fluid to the third impurity concentration. The permeate fluid that is diluted with the vapor having the third impurity concentration is in the ranges of 0 ppm to 100 pmm.

At step 614, the method 600 includes expelling the second portion of the feed fluid (the portion of the feed fluid that is left behind in the first compartment 202 after the filtration process) through a first port centrally located in the upper disk plate, which is otherwise known as the first outlet 208. The second portion that is expelled may be re-circulated back into the feed fluid supply line 116 for re-filtration.

At step 616, the method 600 includes collecting the permeate fluid through a second port centrally located in the lower disk plate 106, which is otherwise known as the second outlet 218, when the third impurity concentration of the permeate fluid is in the range of 0 ppm to less than ppm. In other words, the distillate in the second compartment 212, for example clean water after the filtration process, is collected for further use.

Figure 7:
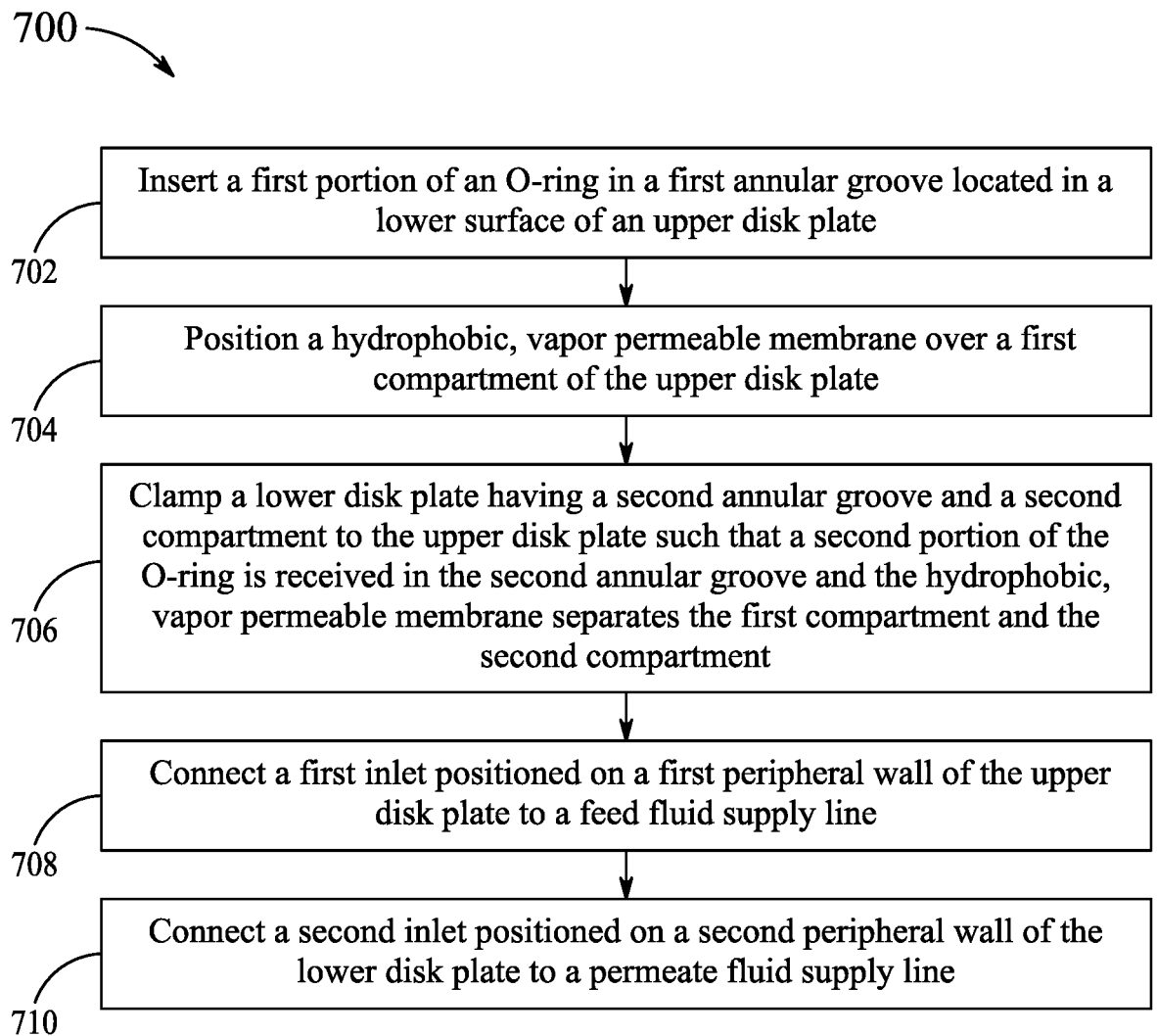
FIG. 7 is an exemplary flowchart illustrating a method of assembling the fluid filter.

Referring to FIG. 7, an exemplary flowchart of a method 700 for assembling the fluid filter 100 is illustrated. The method 700 is described with reference to the fluid filter as illustrated in FIG. 1 through FIG. 5.

At step 702, the method 700 comprises inserting a first portion of the O-ring 140 in the first annular groove 210 located in the lower surface of the upper disk plate 104. In an example, the O-ring 140 can be made of materials that include, but is not limited to, PTFE, nitrile (Buna), neoprene, EPDM Rubber and fluorocarbon (Viton).

At step 704, the method 700 includes positioning the hydrophobic, vapor permeable membrane 110 over the first compartment 202 of the upper disk plate 104.

At step 706, the method 700 includes clamping the lower disk plate 106, having the second annular groove 220 and the second compartment 212, to the upper disk plate 104 such that a second portion of the O-ring 140 is received in the second annular groove 220 and the hydrophobic, vapor permeable membrane 110 separates the first compartment 202 and the second compartment 212. The purpose of using the O-ring 140 is to prevent leakage of fluids (vapor or feed fluid or permeate fluid) from the fluid filter 100.

At step 708, the method 700 includes connecting the first inlet 112 positioned on the first peripheral wall 114 of the upper disk plate 104 to the feed fluid supply line 116. The first inlet 112 is positioned at the first inlet angle 'α1' with respect to the first peripheral wall 114 to induce the first vortex pattern in the first direction. The first inlet angle 'α1' is in the range of 25 degrees to 30 degrees.

At step 710, the method 700 includes connecting the second inlet 118 positioned on the second peripheral wall 120 of the lower disk plate 106 to the permeate fluid supply line 122. The second inlet 118 is positioned at the second inlet angle 'α2' with respect to the second peripheral wall 120 of the lower disk plate 106 to induce the second vortex pattern in the second direction, that is opposite to the first direction. The second inlet angle 'α1' is in the range of minus 25 degrees to minus 30 degrees.

The method 700 further includes positioning the first set of guide vanes 204 at the first vane angle 'β' in the range of 15 degrees to 45 degrees with respect to the upper surface 206 of the first compartment 202; and positioning the second set of guide vanes 214 at the second vane angle 'β2' in the range of minus 15 degrees to minus 45 degrees with respect to the lower surface 216 of the second compartment 212. Such positioning of the first set of guide vanes 204 and the second set of guide vanes 214 ensures that the fluids swirl in opposite directions (or that the vortex pattern is generated in opposite directions), with increased rotational speeds along the first peripheral wall 114 and the second peripheral wall 120, respectively, of the fluid filter 100. The increase in rotational speeds brings about enhanced mixing and turbulence within the fluid filter 100, thereby overcoming shortcomings such as concentration polarization, temperature polarization and fouling. The method 700 further includes clamping the upper disk plate 104 to the lower disk plate 106. To complete the assembly process, the upper disk plate 104 and the lower disk plate 106 are clamped by inserting each of the plurality of threaded screws 136 through the corresponding screw holes 132 extending through the upper disk plate 104 and screwing each of the threaded screws 136 into the threaded screw holes 134 in the lower disk plate 106 until the O-ring 140 is compressed between the upper disk plate 104 and the lower disk plate 106.

The first embodiment of the present disclosure is illustrated with respect to FIG. 1 through FIG. 5. The first embodiment describes the fluid filter 100 for use in filtering the feed fluid. The fluid filter 100 comprises the upper disk plate 104 including the first compartment 202, the lower disk plate 106 spaced apart from and parallel to the upper disk plate 104, the lower disk plate 106 including the second compartment 214, the hydrophobic, vapor permeable membrane 110 positioned between the upper disk plate 104 and the lower disk plate 106, the first inlet 112 positioned on the first peripheral wall 114 of the upper disk plate 104 and connected to the feed fluid having the first temperature, wherein the first inlet 112 is configured such that the feed fluid enters the first compartment 202 at the first inlet angle 'α1' with respect to the first peripheral wall 114 and rotates in the first vortex pattern in the first direction, the second inlet 118 positioned on the second peripheral wall 120 of the lower disk plate 106 and connected to the permeate fluid having the second temperature, wherein the second inlet 118 is configured such that the permeate fluid enters the second compartment 212 at the second inlet angle 'α2' with respect to the second peripheral wall 120 and rotates in the second vortex pattern in the second direction opposite the first direction, wherein the second temperature is lower than the first temperature, the first outlet 112 centrally positioned on the upper surface of the upper disk plate 104, wherein the first outlet 112 is configured to release the feed fluid from the first compartment 202, the second outlet 118 centrally positioned on the lower surface of the lower disk plate 106, wherein the second outlet 118 is configured to release the permeate fluid from the second compartment 212, the clamping device 130 configured to clamp the upper disk plate 104 to the lower disk plate 106, such that the first compartment 202 and the second compartment 212 are separated by the hydrophobic, vapor permeable membrane 110, and wherein the hydrophobic, vapor permeable membrane 110 is configured to filter the feed fluid by passing vapor from the first compartment 202 to the second compartment 212, wherein the vapor dilutes the permeate fluid in the second compartment 212.

In the fluid filter 100, the first set of guide vanes 204 is connected to the upper surface 206 of the first compartment 202, the first set of guide vanes 204 arranged annularly within the first compartment 202, wherein the first set of guide vanes 204 is configured to increase the first rotational speed of the first vortex pattern at the center of the first compartment 202, and the second set of guide vanes 214 connected to the lower surface 216 of the second compartment 212, the second set of guide vanes 214 arranged annularly within the second compartment 212, wherein the second set of guide vanes 214 is configured to increase the second rotational speed of the second vortex pattern at the center of the second compartment 212.

In the fluid filter 100, the first set of guide vanes 204 are positioned at the first vane angle 'β1' with respect to the upper surface 206 of the first compartment 202, such that the first vane angle 'β1' is in the range of 15 degrees to 45 degrees, and the second set of guide vanes 214 are positioned at the second vane angle 'β2' with respect to the lower surface 216 of the second compartment 212, such that the second vane angle 'β2' is in the range of minus 15 degrees to minus 45 degrees.

In the fluid filter 100, the clamping device 130 comprising the first set of screw holes 132 extending through the upper disk plate 104, the second set of threaded screw holes 134 in the lower disk plate 106, the plurality of threaded screws 136, and wherein each of the second set of threaded screw holes 134 is configured to hold a corresponding threaded screw 136 which extends through the corresponding screw hole 132 in the upper disk plate 104, the first annular groove 210 located in the lower surface of the upper disk plate 104, the first annular groove 210 radially located between the first set of screw holes 132 and the first compartment 202, the second annular groove 220 located in the upper surface of the lower disk plate 106, the second annular groove 220 radially located between the second set of threaded screw holes 134 and the second compartment 212, the second annular groove 220 coaxially located to align with the first annular groove 210, the O-ring 140 positioned within the first annular groove 210, wherein the O-ring 140 is configured to block fluid flow between the first compartment 202 and the second compartment 212 when the clamping device 130 is closed.

In the fluid filter 100, the first inlet angle 'α1' is in the range of 25 degrees to 30 degrees and wherein the second inlet angle 'α2' is in the range of 25 degrees Celsius to 40 degrees Celsius.

In the fluid filter 100, the feed fluid is at the first temperature that is in the range of 40 degrees Celsius to 90 degrees Celsius and the permeate fluid is at the second temperature that is in the range of 5 degrees Celsius to less than 40 degrees Celsius.

In the fluid filter 100, the feed fluid has a salinity concentration in the range of 1 ppm to 200,000, and the permeate fluid 114 has then initial salinity concentration of 0 ppm to 100 ppm and the diluted salinity concentration in a range of 0 ppm to less than 100 ppm.

In the fluid filter 100, the feed fluid has an impurity concentration in the range of 1% to 10% and the permeate fluid has the initial impurity concentration of 0% to less than 1% and the diluted impurity concentration in the range of 0% to 0.001%.

The fluid filter 100 further comprises the support structure 402 around the hydrophobic, vapor permeable membrane 110, the support structure 402 includes the first annular ring 404 having the first plurality of spokes 406 and the second annular ring 408 having the second plurality of spokes 410, wherein the first annular ring 404 and the second annular ring 408 are configured to sandwich the hydrophobic, vapor permeable membrane 110.

In the fluid filter 100, the first compartment 202 and the second compartment 212 are constructed from one of polyvinylidene fluoride (PVDF), polypropylene (PP) and polytetrafluoroethylene (PTFE).

The fluid filter 100 comprises the feed fluid reservoir 502, wherein the feed fluid reservoir 502 is connected to the first inlet 112 by the feed fluid supply line 116, the heater 504 connected between the feed fluid supply line 116 and the first inlet 112, the first temperature sensor 506 configured to measure the first temperature and generate the first temperature signal, a controller 511 having circuitry configured to adjust the first temperature to the temperature in the range of 40 degrees Celsius to 90 degrees Celsius based on the first temperature signal.

The fluid filter 100 comprises the permeate fluid supply source 512, wherein the permeate fluid supply source 512 is connected to the second inlet 118 by the permeate fluid supply line 122, a cooler 514 connected between the permeate fluid supply line 122 and the second inlet 118, the second temperature sensor 516 configured to measure the second temperature and generate the second temperature signal, the controller 511 having circuitry configured to adjust the second temperature to the temperature in the range of 5 degrees Celsius to less than 40 degrees Celsius based on the second temperature signal.

The second embodiment of the present disclosure is illustrated with respect to FIG. 1 through FIG. 6. The second embodiment describes the method 600 for filtering feed fluid with the fluid filter 100. The method 600 comprises heating the feed fluid to the first temperature, the feed fluid having the first impurity concentration in the first range greater than or equal to 0 ppm to less than or equal to 200,000 ppm, cooling the permeate fluid to the second temperature lower than the first temperature, the permeate fluid having the second impurity concentration in the second range greater than or equal to 0 ppm and less than or equal to 100 ppm, receiving the feed fluid into the first compartment 202 of the upper disk plate 104 at the first inlet angle '$\alpha 1$' which generates the first vortex pattern of the feed fluid in the first direction, injecting the permeate fluid into the second compartment 212 of the lower disk plate 106 at the second inlet angle '$\alpha 2$', equal and opposite to the first inlet angle '$\alpha 1$', which generates the second vortex pattern of the permeate fluid in the second direction opposite the first direction, adjusting the first temperature until the first portion of the feed fluid which contacts the first surface of the hydrophobic, vapor permeable membrane 110 sandwiched between the first compartment 202 and the second compartment 212 forms a vapor, adjusting the second temperature such that the vapor crosses through the hydrophobic, vapor permeable membrane 110 into the second compartment 212 and condenses into the permeate fluid, thus lowering the second impurity concentration of the permeate fluid to the third impurity concentration, expelling the second portion of the feed fluid through the first port centrally located in the upper disk plate 104, and collecting the permeate fluid from the second port centrally located in the lower disk plate 106 when the third impurity concentration of the permeate fluid is in the range of 0 ppm to less than 100 ppm.

The method 600 further comprises increasing the first rotational speed of the first vortex pattern in the feed fluid in the first direction by passing the feed fluid through the first set of guide vanes 204 connected to the upper surface 206 of the first compartment 202 and arranged annularly within the first compartment 202, and increasing the second rotational speed of the second vortex pattern in the permeate fluid in the second direction by passing the permeate fluid through the second set of guide vanes 214 connected to the lower surface 216 of the second compartment 212 and arranged annularly within the second compartment 212.

The method 600 further comprises heating the feed fluid to the first temperature that is in the range of greater than 40 degrees Celsius to 90 degrees Celsius; and cooling the permeate fluid to the second temperature that is in the range of 5 degrees Celsius to 40 degrees Celsius.

The third embodiment of the present disclosure is illustrated with respect to FIG. 1 through FIG. 5, and FIG. 7. The third embodiment describes the method 700 of assembling the fluid filter 100. The method 700 comprises inserting the first portion of the O-ring 140 in the first annular groove 210 located in the lower surface of the upper disk plate 104, positioning the hydrophobic, vapor permeable membrane 110 over the first compartment 202 of the upper disk plate 104, clamping the lower disk plate 106 having the second annular groove 220 and the second compartment 212 to the upper disk plate 104 such that the second portion of the O-ring 140 is received in the second annular groove 220 and the hydrophobic, vapor permeable membrane 110 separates the first compartment 202 and the second compartment 212, connecting the first inlet 112 positioned on the first peripheral wall 114 of the upper disk plate 104 to the feed fluid supply line 116, and connecting the second inlet 118 positioned on the second peripheral wall 120 of the lower disk plate 106 to the permeate fluid supply line 122.

The method 700 further comprises positioning the first set of guide vanes 204 at the first vane angle 'P' with respect to the upper surface 206 of the first compartment 202, such that the first vane angle '$\beta 1$' is in the range of 15 degrees to 45 degrees; and positioning the second set of guide vanes 214 at the second vane angle '$\beta 2$' with respect to the lower surface 216 of the second compartment 212, such that the second vane angle '$\beta 2$' is in the range of minus 15 degrees to minus 45 degrees.

The method 700 further comprises clamping the upper disk plate 104 to the lower disk plate 106 by inserting each of the plurality of threaded screws 136 through the corresponding screw hole 132 extending through the upper disk plate 104 and screwing each of the plurality of threaded screws 136 into the second set of threaded screw holes 134 in the lower disk plate 106 until the O-ring 140 is compressed between the upper disk plate 104 and the lower disk plate 106.

The method 700 further comprises positioning the first inlet 112 in the first peripheral wall 114 of the upper disk plate 104 at the first inlet angle '$\alpha 1$' in the range of 25 degrees to 30 degrees; and positioning the second inlet 118 in the second peripheral wall 120 of the lower disk plate 106 at the second inlet angle '$\alpha 2$' in the range of minus 25 degrees to minus 30 degrees.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A fluid filter comprising:
an upper disk plate including a first compartment;
a lower disk plate spaced apart from and parallel to the upper disk plate, the lower disk plate including a second compartment;
a hydrophobic, vapor permeable membrane positioned between the upper disk plate and the lower disk plate;
a first inlet positioned on a first peripheral wall of the upper disk plate and connected to a feed fluid having a first temperature, wherein the first inlet is configured such that the feed fluid enters the first compartment at a first inlet angle with respect to the first peripheral wall and rotates in a first vortex pattern in a first direction;
a second inlet positioned on a second peripheral wall of the lower disk plate and connected to a permeate fluid having a second temperature, wherein the second inlet is configured such that the permeate fluid enters the second compartment at a second inlet angle with respect to the second peripheral wall and rotates in a second vortex pattern in a second direction opposite the first direction, wherein the second temperature is lower than the first temperature;
a first outlet centrally positioned on an upper surface of the upper disk plate, wherein the first outlet is configured to release the feed fluid from the first compartment;
a second outlet centrally positioned on a lower surface of the lower disk plate, wherein the second outlet is configured to release the permeate fluid from the second compartment;
a clamping device configured to clamp the upper disk plate to the lower disk plate, such that the first compartment and the second compartment are separated by the hydrophobic, vapor permeable membrane; and wherein the hydrophobic, vapor permeable membrane is configured to filter the feed fluid by passing vapor from the first compartment to the second compartment, wherein the vapor dilutes the permeate fluid in the second compartment.

2. The fluid filter of claim 1, further comprising:

a first set of guide vanes connected to an upper surface of the first compartment, the first set of guide vanes arranged annularly within the first compartment, wherein the first set of guide vanes is configured to increase a first rotational speed of the first vortex pattern at a center of the first compartment; and a second set of guide vanes connected to a lower surface of the second compartment, the second set of guide vanes arranged annularly within the second compartment, wherein the second set of guide vanes is configured to increase a second rotational speed of the second vortex pattern at a center of the second compartment.

3. The fluid filter of claim 2, wherein:

the first set of guide vanes are positioned at a first vane angle with respect to the upper surface of the first compartment, such that the first vane angle is in a range of 15 degrees to 45 degrees; and the second set of guide vanes are positioned at a second vane angle with respect to the lower surface of the second compartment, such that the second vane angle is in a range of minus 15 degrees to minus 45 degrees.

4. The fluid filter of claim 1, the clamping device comprising:

a first set of screw holes extending through the upper disk plate;

a second set of threaded screw holes in the lower disk plate;

a plurality of threaded screws; and wherein each of the second set of threaded screw holes is configured to hold a corresponding threaded screw which extends through a corresponding screw hole in the upper disk plate.

5. The fluid filter of claim 4, further comprising:

a first annular groove located in a lower surface of the upper disk plate, the first annular groove radially located between the first set of screw holes and the first compartment;

a second annular groove located in an upper surface of the lower disk plate, the second annular groove radially located between the second set of threaded screw holes and the second compartment, the second annular groove coaxially located to align with the first annular groove;

an O-ring positioned within the first annular groove, wherein the O-ring is configured to block fluid flow between the first compartment and the second compartment when the clamping device is closed.

6. The fluid filter of claim 1, wherein the first inlet angle is in a range of 25 degrees to 30 degrees and wherein the second inlet angle is in a range of 25 degrees to 30 degrees.

7. The fluid filter of claim 1, wherein the first temperature is in a range of 40 degrees Celsius to 90 degrees Celsius and the second temperature is in a range of 5 degrees Celsius to less than 40 degrees Celsius, and wherein the second temperature is at least 5 degrees less than the first temperature.

8. The fluid filter of claim 1, wherein:

the feed fluid has a salinity concentration in a range of 1 ppm to 200,000 ppm and the permeate fluid has an initial salinity concentration of 0 ppm to 100 ppm and a diluted salinity concentration in a range of 0 ppm to less than 100 ppm.

9. The fluid filter of claim 1, wherein the feed fluid has an impurity concentration in a range of 1% to 10% and the permeate fluid has an initial impurity concentration of 0% to less than 1% and a diluted impurity concentration in a range of 0% to 0.001%.

10. The fluid filter of claim 1, further comprising:

a support structure around the hydrophobic, vapor permeable membrane, the support structure including a first annular ring having a first plurality of spokes and a second annular ring having a second plurality of spokes, wherein the first annular ring and the second annular ring are configured to sandwich the hydrophobic, vapor permeable membrane.

11. The fluid filter of claim 1, wherein the first compartment and the second compartment are constructed from one of polyvinylidene fluoride (PVDF), polypropylene (PP) and polytetrafluoroethylene (PTFE).

12. The fluid filter of claim 1, further comprising:

a feed fluid reservoir, wherein the feed fluid reservoir is connected to the first inlet by a feed fluid supply line;

a heater connected between the first feed fluid supply line and the first inlet;

a first temperature sensor configured to measure the first temperature and generate a first temperature signal;

a controller having circuitry configured to adjust the first temperature to a temperature in a range of 40 degrees Celsius to 90 degrees Celsius based on the first temperature signal.

13. The fluid filter of claim 1, further comprising:

a permeate fluid supply source, wherein the permeate fluid supply source is connected to the second inlet by a permeate fluid supply line;

a cooler connected between the permeate fluid supply line and the second inlet;

a second temperature sensor configured to measure the second temperature and generate a second temperature signal; and a controller having circuitry configured to adjust the second temperature to a temperature in a range of 5 degrees Celsius to less than 40 degrees Celsius based on the second temperature signal.

14. A method of filtering a feed fluid, comprising:

heating the feed fluid to a first temperature, the feed fluid having a first impurity concentration in a first range of 1 ppm to 200,000 ppm;

cooling a permeate fluid to a second temperature lower than the first temperature, the permeate fluid having a second impurity concentration in a second range greater than or equal to 0 ppm to 100 ppm;

receiving the feed fluid into a first compartment of an upper disk plate at a first inlet angle which generates a first vortex pattern of the feed fluid in a first direction;

receiving the permeate fluid into a second compartment of a lower disk plate at a second inlet angle, equal and opposite to the first inlet angle, which generates a second vortex pattern of the permeate fluid in a second direction opposite the first direction;

adjusting the first temperature of the feed fluid until a first portion of the feed fluid which contacts a first surface of a hydrophobic, vapor permeable membrane sandwiched between the first compartment and the second compartment forms a vapor;

adjusting the second temperature of the permeate fluid such that the vapor crosses through the hydrophobic, vapor permeable membrane into the second compartment and condenses into the permeate fluid, thus lowering the second impurity concentration of the permeate fluid to a third impurity concentration;
expelling a second portion of the feed fluid through a first port centrally located in the upper disk plate; and
collecting the permeate fluid from a second port centrally located in the lower disk plate when the third impurity concentration of the permeate fluid is in a range 0 ppm to less than 100 ppm.

15. The method of claim 14, further comprising:
increasing a first rotational speed of the first vortex pattern in the feed fluid in the first direction by passing the feed fluid through a first set of guide vanes connected to an upper surface of the first compartment and arranged annularly within the first compartment; and
increasing a second rotational speed of the second vortex pattern in the permeate fluid in the second direction by passing the permeate fluid through a second set of guide vanes connected to a lower surface of the second compartment and arranged annularly within the second compartment.

16. The method of claim 14, further comprising:
heating the feed fluid to the first temperature that is in a range of 40 degrees Celsius to 90 degrees Celsius; and
cooling the permeate fluid to the second temperature that is in a range of 5 degrees Celsius to 40 degrees Celsius, wherein the second temperature is at least 5 degrees lower than the first temperature.

17. A method of assembling a fluid filter, comprising:
inserting a first portion of an O-ring in a first annular groove located in a lower surface of an upper disk plate;
positioning a hydrophobic, vapor permeable membrane over a first compartment of the upper disk plate;
clamping a lower disk plate having a second annular groove and a second compartment to the upper disk plate such that a second portion of the O-ring is received in the second annular groove and the hydrophobic, vapor permeable membrane separates the first compartment and the second compartment;
connecting a first inlet positioned on a first peripheral wall of the upper disk plate to a feed fluid supply line;
connecting a second inlet positioned on a second peripheral wall of the lower disk plate to a permeate fluid supply line,
positioning a first set of guide vanes at a first vane angle with respect to an upper surface of the first compartment, such that the first vane angle is in a range of 15 degrees to 45 degrees; and
positioning a second set of guide vanes at a second vane angle with respect to a lower surface of the second compartment, such that the second vane angle is in the range of minus 15 degrees to minus 45 degrees,
wherein the first set of guide vanes arranged within the first compartment and the second set of guide vanes arranged within the second compartment.

18. The method of claim 17, further comprising clamping the upper disk plate to the lower disk plate by:
inserting each of a first set of threaded screws through a corresponding screw hole extending through the upper disk plate; and
screwing each of the first set of threaded screws into a second set of threaded screw holes in the lower disk plate until the O-ring is compressed between the upper disk plate and the lower disk plate.

19. The method of claim 17, further comprising:
positioning the first inlet in the first peripheral wall of the upper disk plate at an angle in a range of 25 degrees to 30 degrees; and
positioning the second inlet in the second peripheral wall of the lower disk plate at a second inlet angle in a range of minus 25 degrees to minus 30 degrees.

* * * * *